(12) United States Patent
Komagata et al.

(10) Patent No.: US 7,579,743 B2
(45) Date of Patent: Aug. 25, 2009

(54) MAGNET ROTOR, MOVABLE MAGNET-TYPE INSTRUMENT WITH THE MAGNET ROTOR, AND STEPPING MOTOR WITH THE MAGNET ROTOR

(75) Inventors: Takahiro Komagata, Niigata (JP); Hideki Sato, Niigata (JP); Toru Hasegawa, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 298 days.

(21) Appl. No.: 11/661,395

(22) PCT Filed: Aug. 1, 2005

(86) PCT No.: PCT/JP2005/014019

§ 371 (c)(1),
(2), (4) Date: Feb. 28, 2007

(87) PCT Pub. No.: WO2006/025170

PCT Pub. Date: Mar. 9, 2006

(65) Prior Publication Data

US 2008/0100173 A1    May 1, 2008

(30) Foreign Application Priority Data

Aug. 31, 2004  (JP) .............................. 2004-251464

(51) Int. Cl.
*H02K 1/22* (2006.01)

(52) U.S. Cl. ................. 310/261; 310/49 R; 310/43; 310/156.38

(58) Field of Classification Search ............... 310/49 R, 310/261, 265, 43, 156.12–156.15, 156.38–156.45
See application file for complete search history.

(56) References Cited

U.S. PATENT DOCUMENTS

| | | | | |
|---|---|---|---|---|
| 4,206,377 A | * | 6/1980 | Sudler | 310/49 R |
| 4,267,472 A | * | 5/1981 | Sudler et al. | 310/49 R |
| 4,795,930 A | * | 1/1989 | Schwartz et al. | 310/49 R |
| 5,465,020 A | * | 11/1995 | Peterson | 310/194 |
| 5,500,994 A | * | 3/1996 | Itaya | 29/598 |

(Continued)

FOREIGN PATENT DOCUMENTS

JP        58-87476 U     6/1983

(Continued)

*Primary Examiner*—Thanh Lam
(74) *Attorney, Agent, or Firm*—McDermott Will & Emery LLP

(57) ABSTRACT

A magnet rotor in which rotation prevention and positional displacement (rattling, and misalignment of axes) between a magnet and a rotor body can be restricted, a movable magnet type-instrument with the magnet rotor, and a stepping motor with the magnet rotor. In the magnet rotor, projections (11) and recesses (12) arranged with predetermined intervals and formed in a substantially rectangular shape are provided on the inner wall of a hollow section of an annular magnet (10). Rising side wall sections (11A) defined by the projections (11) are radially directed with the position of the axis (G) of the magnet rotor (R) as the standard. In the rotor body (20), rotation prevention sections (21) for preventing relative rotation between the rotor body (20) and the annular magnet (10) are formed by placing a plastic material along the shapes of the projections (11) and the recesses (12).

7 Claims, 10 Drawing Sheets

U.S. PATENT DOCUMENTS

| | | | |
|---|---|---|---|
| 5,945,758 A * | 8/1999 | Goltz et al. | 310/90 |
| 6,031,305 A * | 2/2000 | Satoh et al. | 310/49 R |
| 2001/0048261 A1* | 12/2001 | Kojima et al. | 310/156.13 |
| 2002/0190594 A1* | 12/2002 | Numaya | 310/156.48 |
| 2007/0132335 A1* | 6/2007 | Ionel et al. | 310/261 |

FOREIGN PATENT DOCUMENTS

| | | |
|---|---|---|
| JP | 2-123949 A | 5/1990 |
| JP | 2001-289876 A | 10/2001 |
| JP | 2001-317970 A | 11/2001 |
| JP | 2001-339932 A | 12/2001 |

* cited by examiner (A)

(B)

(A)

(B)

(A)

(B)

MAGNET ROTOR, MOVABLE MAGNET-TYPE INSTRUMENT WITH THE MAGNET ROTOR, AND STEPPING MOTOR WITH THE MAGNET ROTOR

RELATED APPLICATION

This application is the U.S. National Phase under 35 U.S.C. §371 of International Application No. PCT/JP2005/014019, filed on Aug. 1, 2005, which claims priority of JP 2004-251464, filed on Aug. 31, 2004, the disclosures of which Application is incorporated by reference herein.

TECHNICAL FIELD

The present invention relates specifically to a magnet rotor, which operates upon energization of a coil, or a movable magnet-type instrument, which uses a magnet rotor, a stepping motor, which uses a magnet rotor, or a small-sized motor, which uses a magnet rotor, or a generator, or the like.

BACKGROUND ART

Conventionally, for example, a movable magnet-type instrument (see, for example, Patent Document 1) provided with a magnet rotor, which operates upon energization of a coil, or an instrument (see, for example, Patent Document 2) rotationally supported with the use of a stepping motor, which comprises a magnet rotor supported rotatably in a stator, is adopted as, for example, an instrument for vehicles.
Patent Document 1: JP-A-2001-289876
Patent Document 2: JP-A-2001-317970

As a conventional magnet rotor used for a movable magnet-type instrument, a stepping motor, etc., with a view to miniaturization and lightening, a rotor body made of a plastic material is integrally and coaxially formed in a hollow of an annularly molded magnet by means of insert-molding or the like to constitute a magnet rotor.

DISCLOSURE OF THE INVENTION

Problems that the Invention is to Solve

By the way, a conventional magnet rotor used for a movable magnet-type instrument, a stepping motor, etc. involves a problem that when a rotor body made of a plastic material is insert-molded in a hollow of an annularly molded magnet by means of injection molding or the like, the rotor body made of a heated and expanded plastic material is cooled under the condition of room temperature after molding to contract, and so a clearance is generated between the magnet and the rotor body to lead to generation of rattle between the magnet and the rotor body. Here, taking account of the problem, it is proposed to provide irregularities on an inner wall portion of a hollow of an annularly molded magnet to achieve prevention of rotation and of rattle.

However, only application of irregularities somewhat cancels prevention of rotation but causes a problem that a rotor body itself made of a plastic material according to an irregular shape of a magnet contracts as a whole according to the irregular shape to generate a clearance and the magnet becomes eccentric relative to an axial position of a magnet rotor to cause the magnet rotor to generate rotational deflection. Hereupon, a construction of a magnet rotor, in which a projection on a rotor body is wedge-shaped (an inner peripheral side is narrow in width and an outer peripheral side is large in width) to provide an irregular shape, is proposed and disclosed in, for example, Patent Document 3. With such construction, since the wedge-shaped projection is joined to a recess on a magnet side in a state of contact even when the rotor body contracts, prevention of axial displacement is made possible in addition to prevention of rotation, but there is a fear that the wedge-shaped projecting location is applied as a constant stress to a corner of the magnet and such stress partially breaks the magnet. Also, in the case where the irregular shape comprises irregularities being simple in shape such as a triangular shape and a rectangular shape, the rotor body contracts toward a center as a whole, so that there is caused a problem that a clearance is liable to be produced between the magnet and the rotor body and inconvenience cannot be cancelled.

Patent Document 3: JP-UM-A-58-87476

Hereupon, the invention pays an attention to the conventional problems and has its object to provide a magnet rotor, which takes into consideration configurations of an annular magnet and a molded rotor body, which constitute the magnet rotor, to thereby suppress rotation prevention and positional displacement (rattle, axial displacement) between a magnet and a rotor body even when an action of contraction of the rotor body works, a movable magnet-type instrument provided with the rotor body, and a stepping motor provided with the rotor body.

Means for Solving the Problems

According to the invention, a magnet rotor according to claim 1 is constructed by integrally and coaxially forming an annular-shaped magnet polarized so that adjacent magnet poles make different poles, and a rotor body made of a plastic material and arranged in a hollow of the annular-shaped magnet, the magnet rotor characterized in that a projection and a recess are provided at predetermined interval on an inner peripheral wall of the hollow of the annular-shaped magnet to be made substantially rectangular in shape, rising side wall sections provided by the projection are formed to extend in a radial direction with a position of an axis of the magnet rotor as a reference, and a rotation prevention section for the annular-shaped magnet is formed on the rotor body by filling a plastic material following configurations of the projection and the recess.

With such construction, the rising side wall sections provided by the projection, which are formed substantially rectangular in shape and arranged at predetermined intervals, are formed on the inner peripheral wall of the hollow of the magnet to extend in the radial direction with a position of the axis of the magnet rotor as a reference, whereby even when the rotor body contracts as a whole, the rotation prevention section of the rotor body also contracts toward the axis of the magnet rotor, which corresponds to a position of intersection of the respective side wall sections provided on the projection of the magnet, so that coaxial holding can be made in a state of rotation prevention without any displacement of the axis.

Also, the magnet rotor according to claim 1 has a feature in that the annular-shaped magnet is made of a plastic material (claim 2).

With such construction, the rotor body can be succeedingly molded by means of injection molding or the like after the annular-shaped magnet is molded from a plastic material, so that it is possible to provide a magnet rotor, which is easy to manufacture.

Also, the magnet rotor according to claim 1 or 2 has a feature in that the rotor body provided on the magnet rotor is formed with an axial hole, through which a spindle is inserted into an axial portion of the rotor body (claim 3).

With such construction, it is possible to form the magnet rotor to make the same rotatable with the spindle as a basic point.

Also, the magnet rotor according to claim 1 or 2 has a feature in that the rotor body provided on the magnet rotor is formed integrally on upper and lower shaft core portions thereof with a rotation spindle, which is made of a plastic material (claim 4).

With such construction, it is possible to mold the magnet rotor and the rotation spindle integrally to provide a magnet rotor, which is easy to manufacture.

Also, the magnet rotor according to claims 1 to 4 has a feature in that the rotor body provided on the magnet rotor is formed integrally with a branch transmission gear section, by which rotation of the magnet rotor is branched outside to enable rotational driving (claim 5).

With such construction, rotational driving can be branched and transmitted to other rotation transmission sections via the branch transmission gear section, so that it is possible to transmit rotation to a location distant from the axis of the magnet rotor.

Also, a movable magnet-type instrument comprising a magnet rotor, which operates upon energization of a coil, the magnet rotor is the magnet rotor according to any one of claims 1 to 5 (claim 6).

With such construction, it is possible to provide a movable magnet-type instrument, which enables miniaturization and lightening and cancels displacement of the axis of the magnet rotor to enable smooth, rotational operation.

Also, a stepping motor comprising a magnet rotor supported rotatably in a stator has a feature in that the magnet rotor is a magnet rotor according to any one of claims 1 to 5 (claim 7).

With such construction, it is possible to provide a stepping motor, which enables miniaturization and lightening and cancels displacement of the axis of the magnet rotor to enable smooth, rotational operation.

Effect of the Invention

With a magnet rotor, a movable magnet-type instrument, which uses the magnet rotor, and a stepping motor, which uses the magnet rotor, according to the invention, a magnet rotor is constructed by integrally and coaxially forming an annular-shaped magnet polarised so that adjacent magnet poles make different poles, and a rotor body made of a plastic material and arranged in a hollow of the annular-shaped magnet, a projection and a recess are provided at predetermined interval on an inner peripheral wall of the hollow of the annular-shaped magnet to be made substantially rectangular in shape, rising side wall sections provided by the projection are formed to extend in a radial direction with a position of an axis of the magnet rotor as a reference, and a rotation prevention section for the annular-shaped magnet is formed on the rotor body by filling a plastic material following configurations of the projection and the recess, whereby even when the rotor body contracts as a whole, the rotation prevention section of the rotor body also contracts toward the axis of the magnet rotor, which corresponds to a position of intersection of the respective side wall sections provided on the projection of the magnet, so that coaxial holding can be made in a state of rotation prevention without any displacement of the axis, thus enabling preventing positional displacement to thereby attain an initial object.

DESCRIPTION OF REFERENCE NUMERALS AND SIGNS

Figure 1:
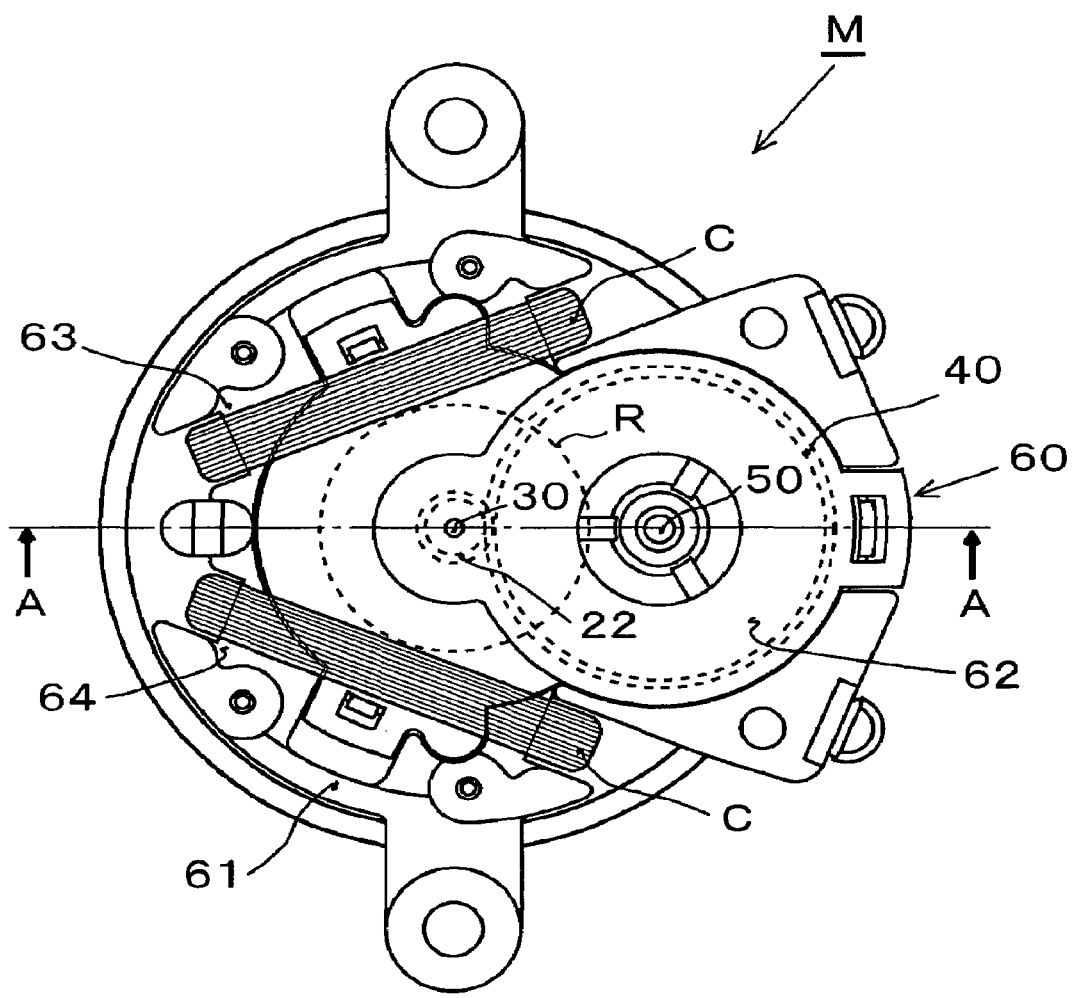
FIG. 1 is a plan view showing a whole of a magnet rotor, according to a first embodiment of the invention, applied to a movable magnet-type instrument.

C: coil
D: drive transmission section
G: axis
M: movable magnet-type instrument
P: pointer
R: magnet rotor
10: annular plastic magnet
11: projection
12: recess
11A: rising side wall section
20: rotor body
21: rotation prevention section
21A: both side walls (side wall sections)
22: lower flange section
23: upper flange section
24: branch transmission gear section
25: axial hole
26: rotation spindle
30: spindle
40: driven transmission gear section
50: pointer shaft
60: housing
61: first frame body
62: second frame body
63, 64: wound frame section
70: shield case

BEST MODE FOR CARRYING OUT THE INVENTION

An embodiment, in which a magnet rotor according to the invention is applied to a movable magnet-type instrument, will be described below with reference to the accompanying drawings.

Figure 2:
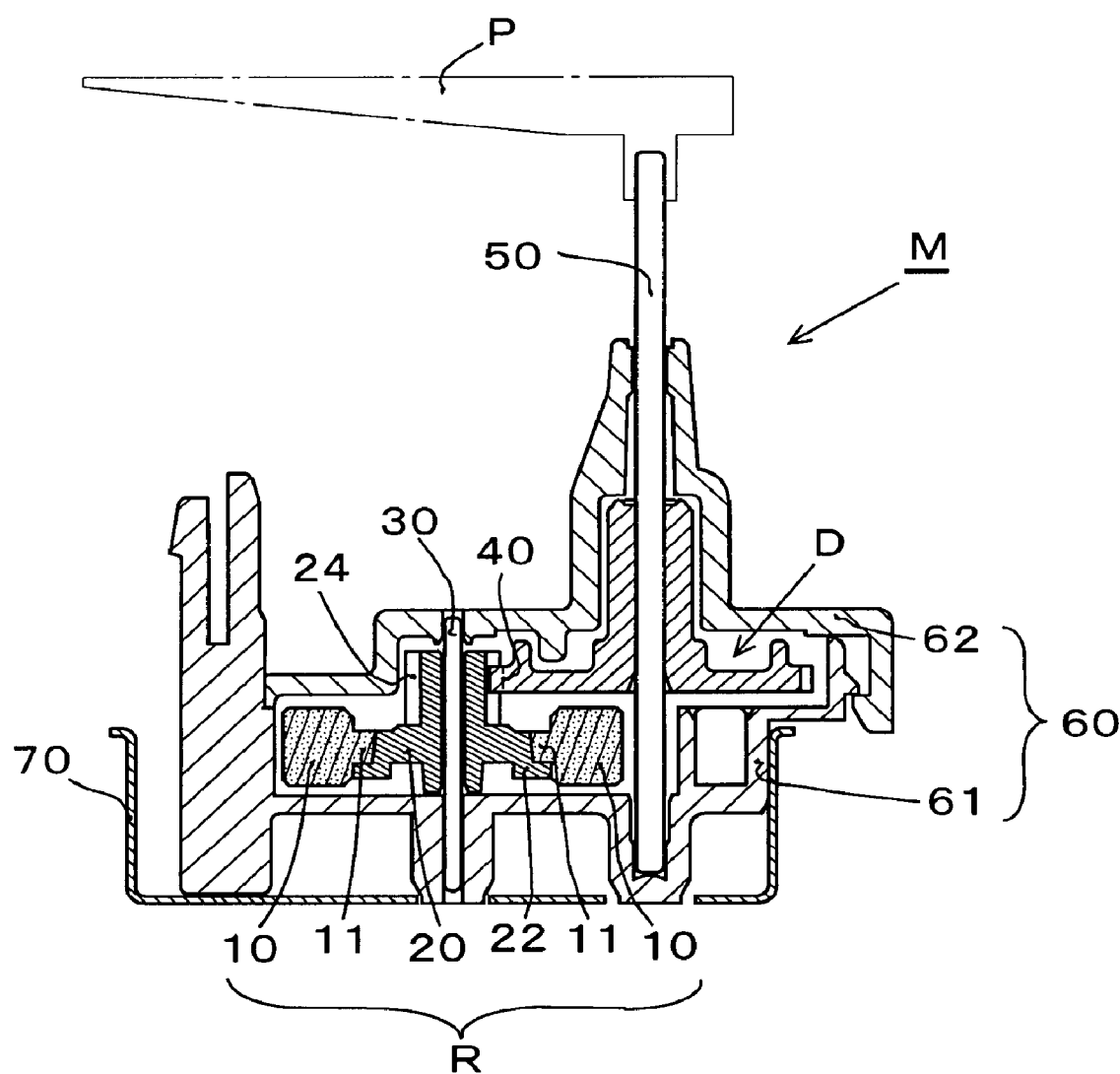
FIG. 2 is a cross sectional view taken along the line A-A in FIG. 1.
Figure 3:
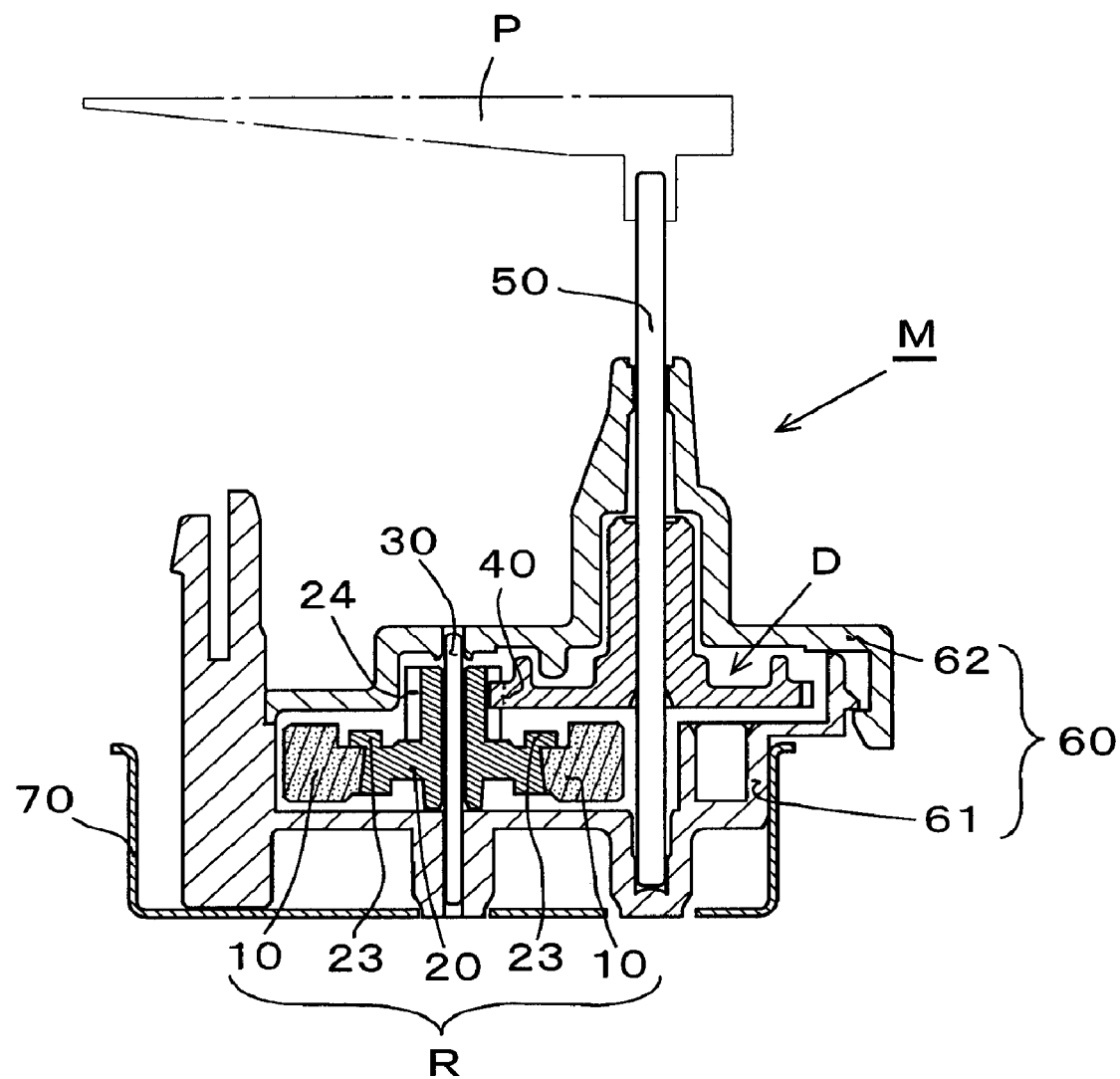
FIG. 3 is a cross sectional view-showing a construction of a main part in a state, in which the magnet rotor in FIG. 2 is turned 45 degrees.
Figure 4:
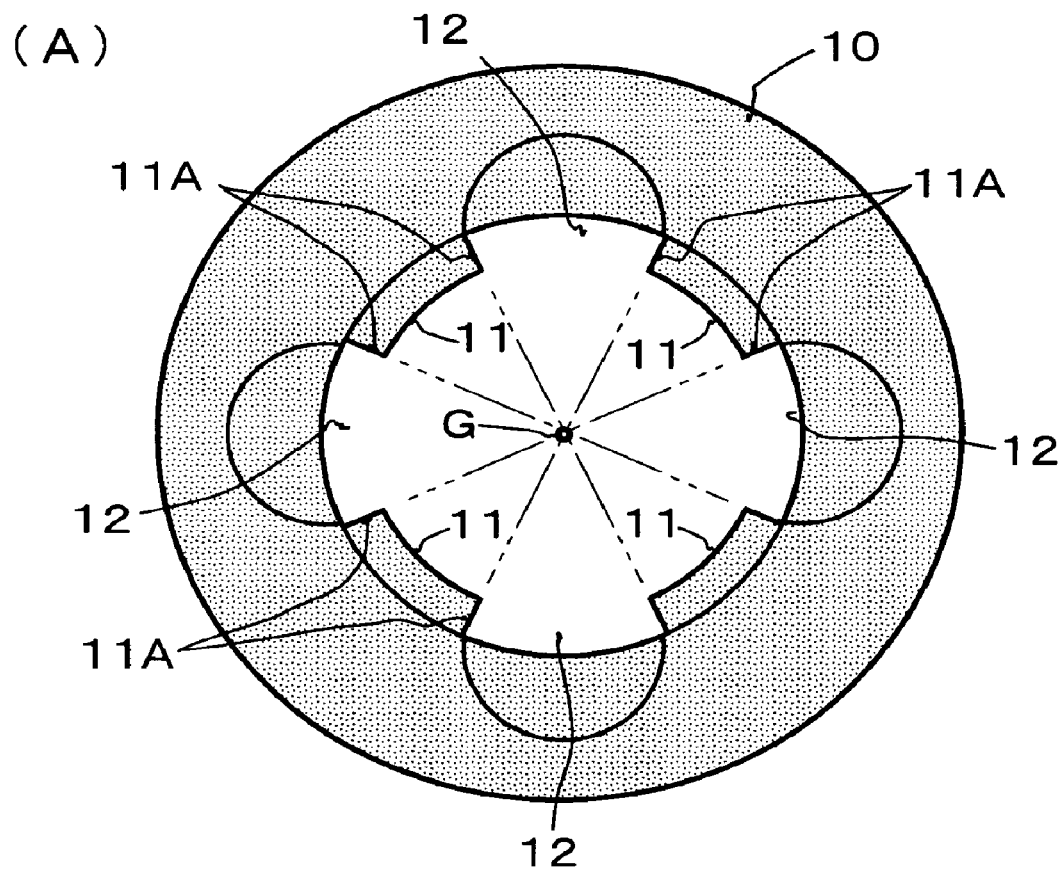
FIGS. 4(A) and 4(B) are a plan view and a perspective view showing a structure of a main part of an annular magnet, which constitutes a part of the magnet rotor.
Figure 4:
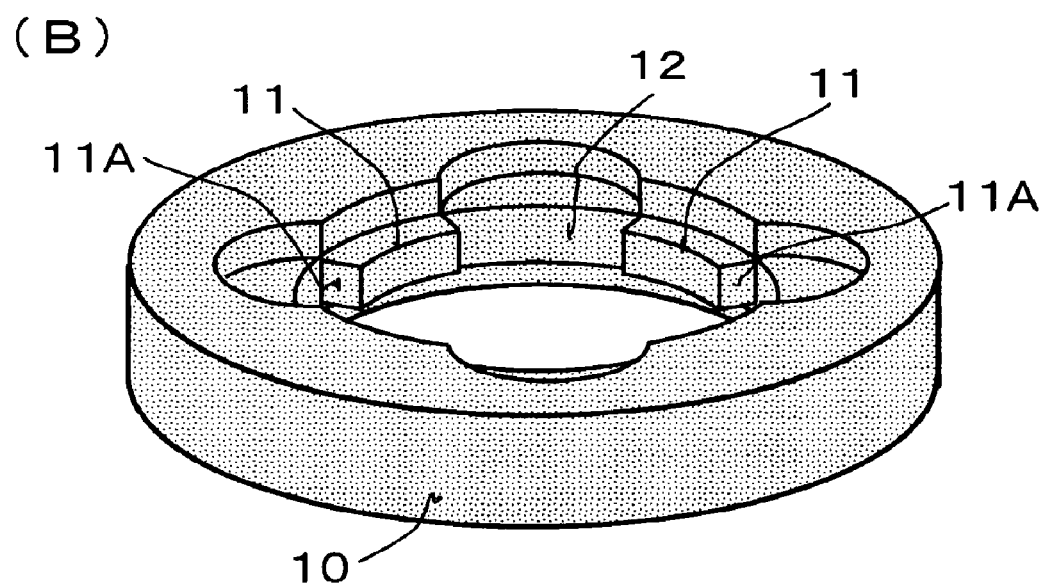
Figure 5:
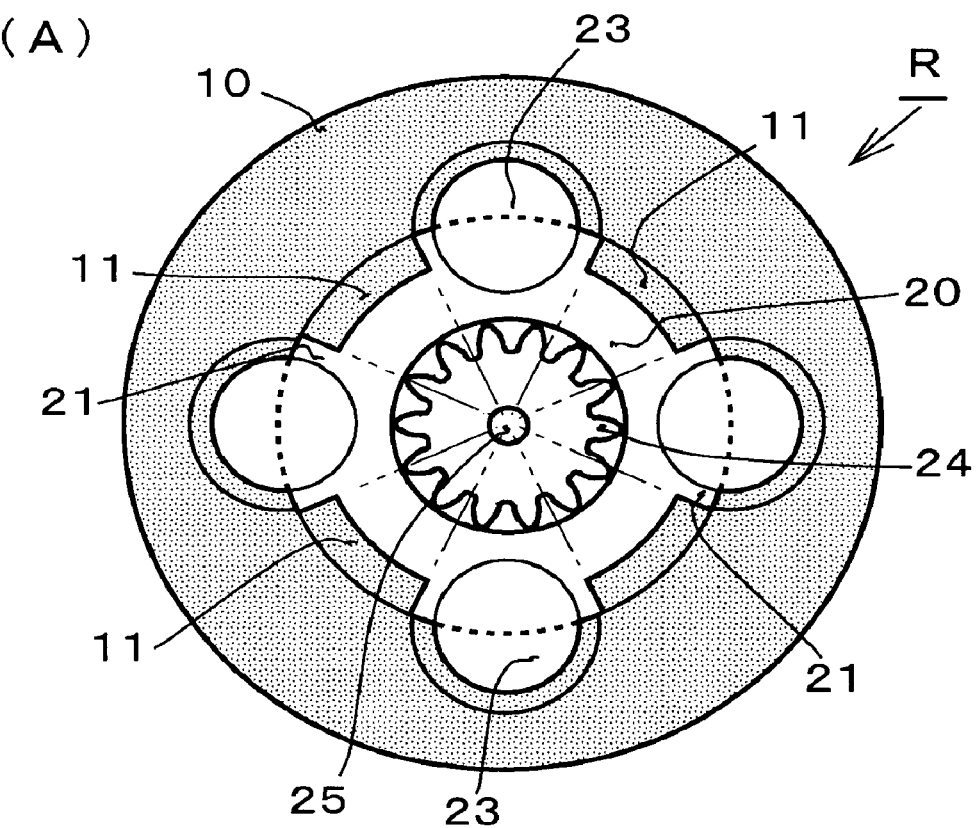
FIGS. 5(A) and 5(B) are a plan view and a perspective view showing a state, in which the annular magnet and a rotor body of the magnet rotor are injection-molded.
Figure 5:
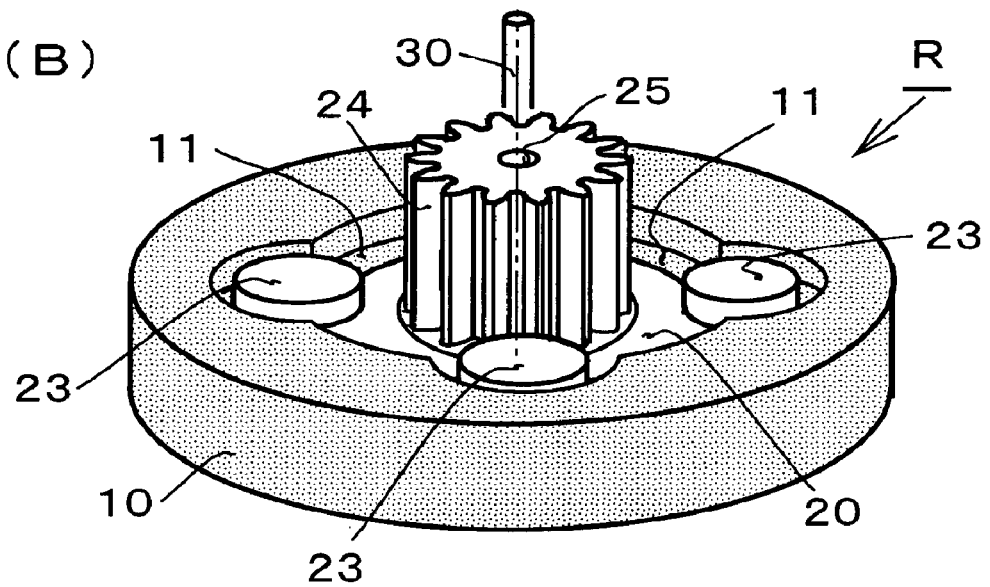
Figure 6:
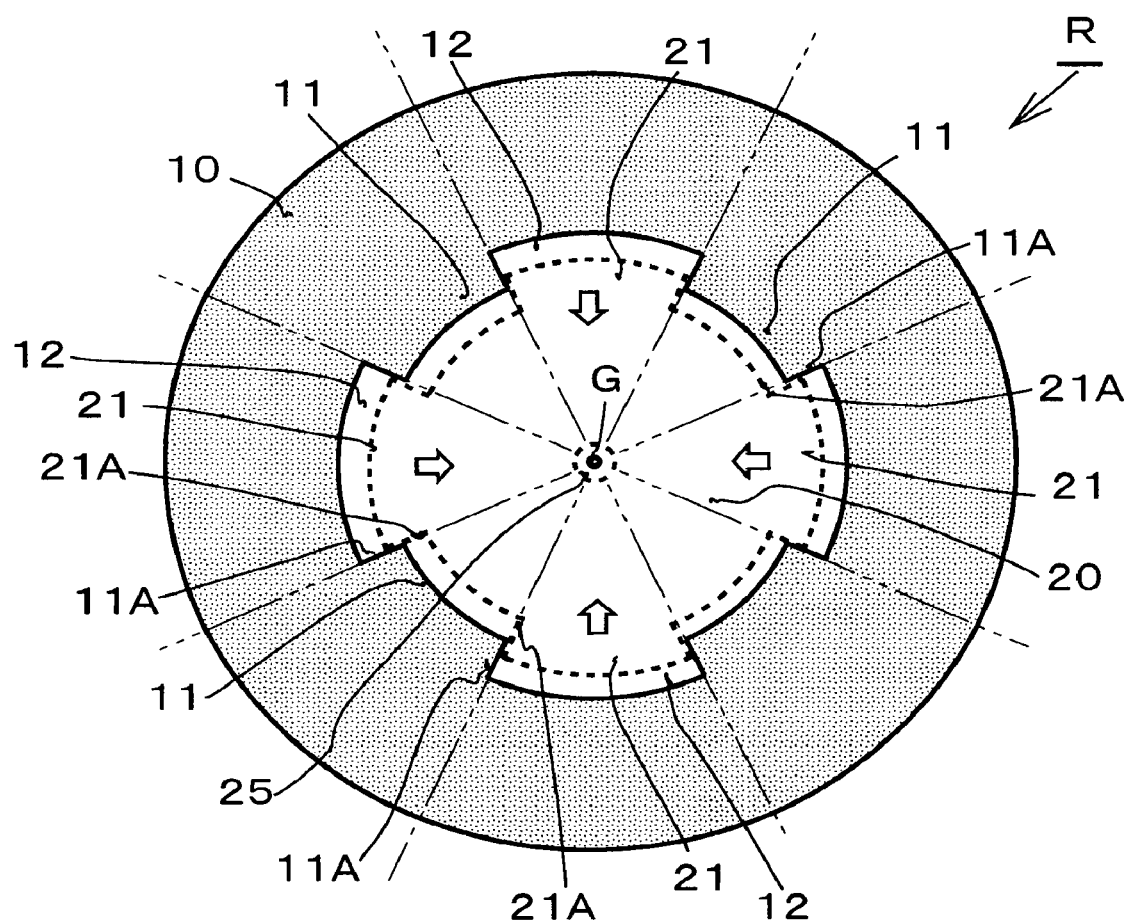
FIG. 6 is a cross sectional view schematically showing a state, in which the rotor body contracts after molding in FIG. 5.
Figure 7:
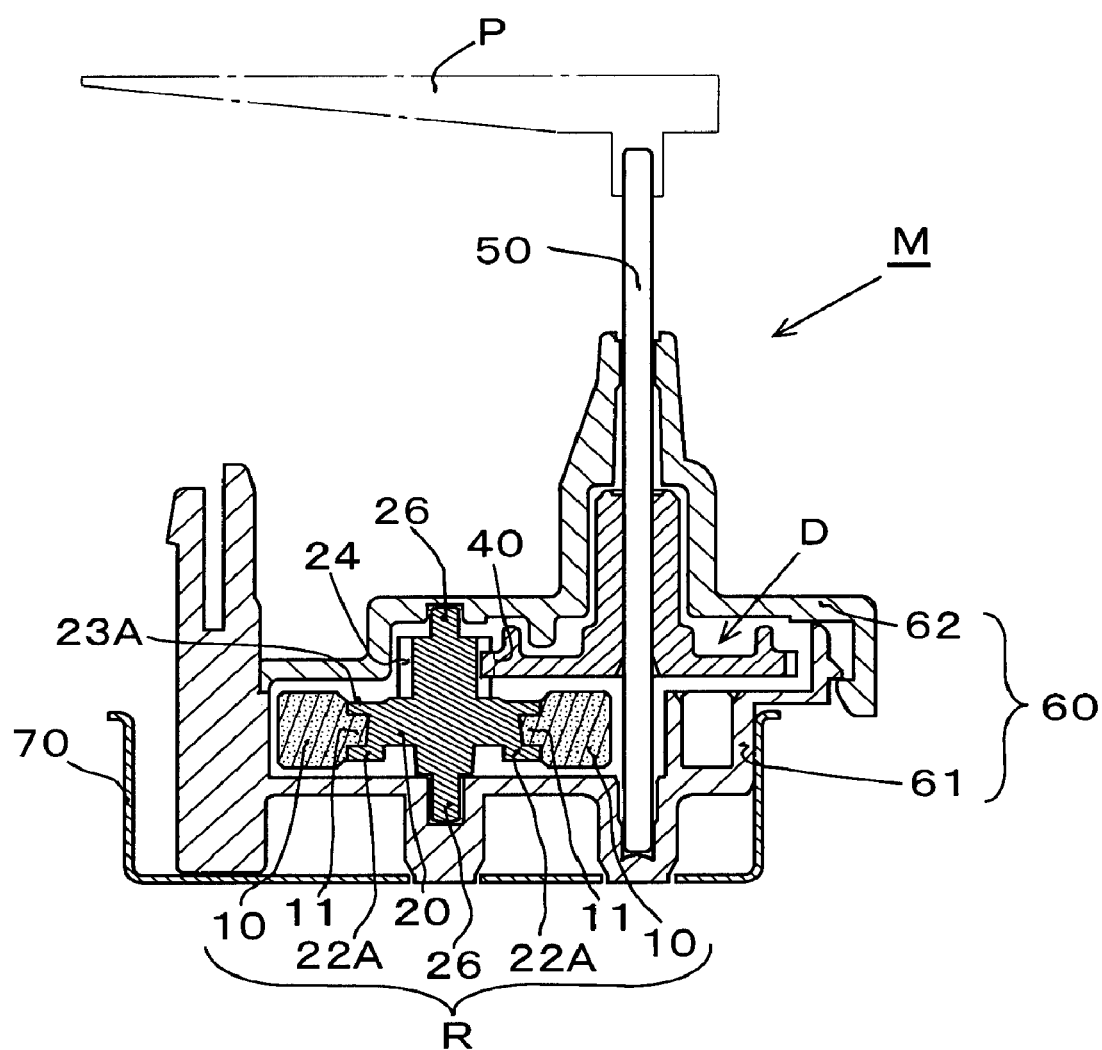
FIG. 7 is a cross sectional view showing a construction of a main part of a magnet rotor, according to a second embodiment of the invention, applied to a movable magnet-type instrument.
Figure 8:
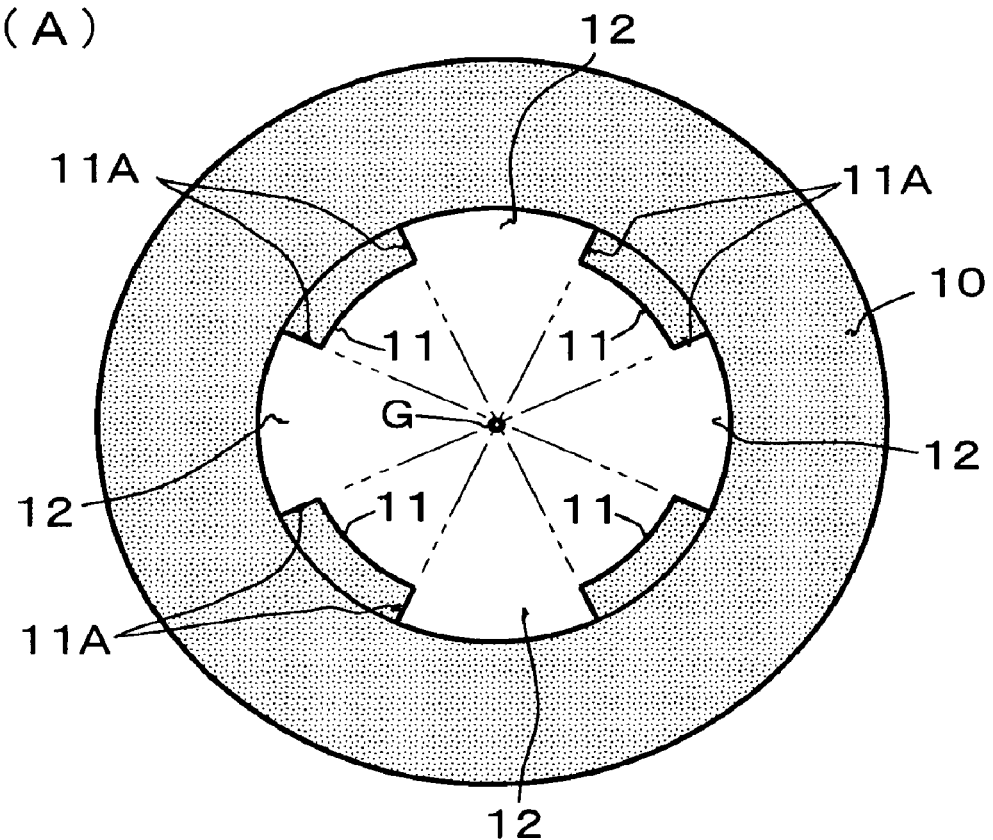
FIGS. 8(A) and 8(B) are a plan view and a perspective view showing a construction of a main part of an annular magnet, which constitutes a part of a magnet rotor before a rotor body is injection-molded.
Figure 8:
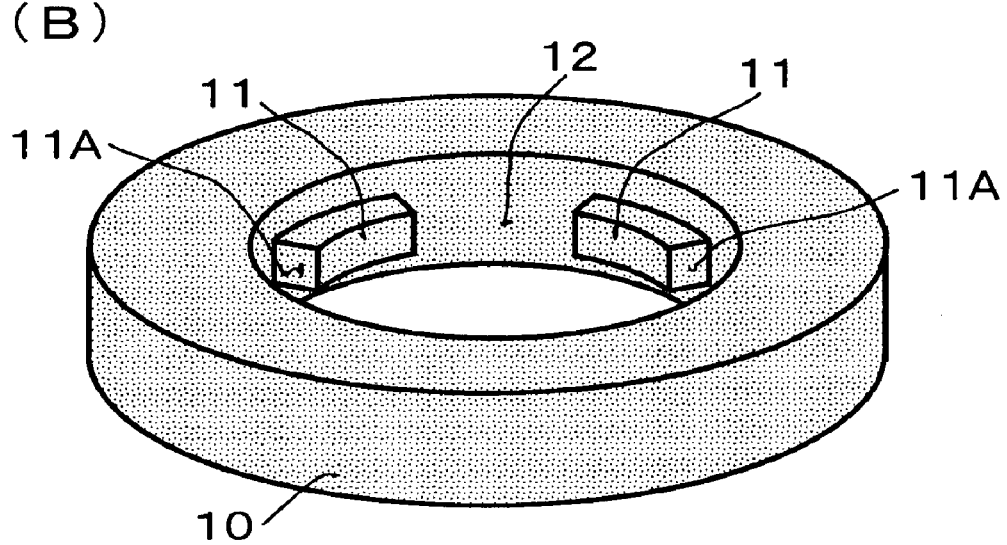
Figure 9:
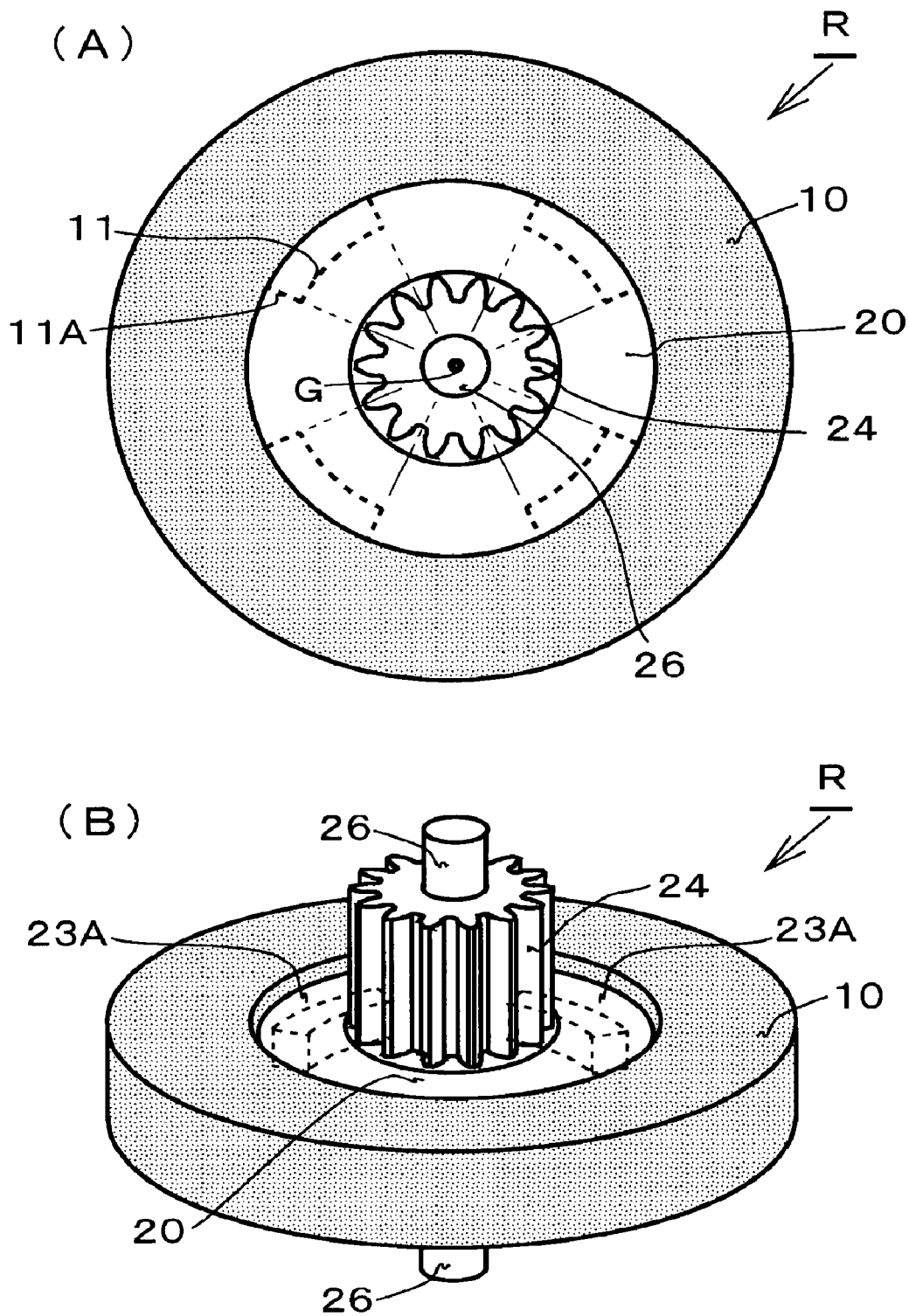
FIGS. 9(A) and 9(B) are a plan view and a perspective view showing a state, in which the annular magnet and a rotor body of the magnet rotor are injection-molded.
Figure 10:
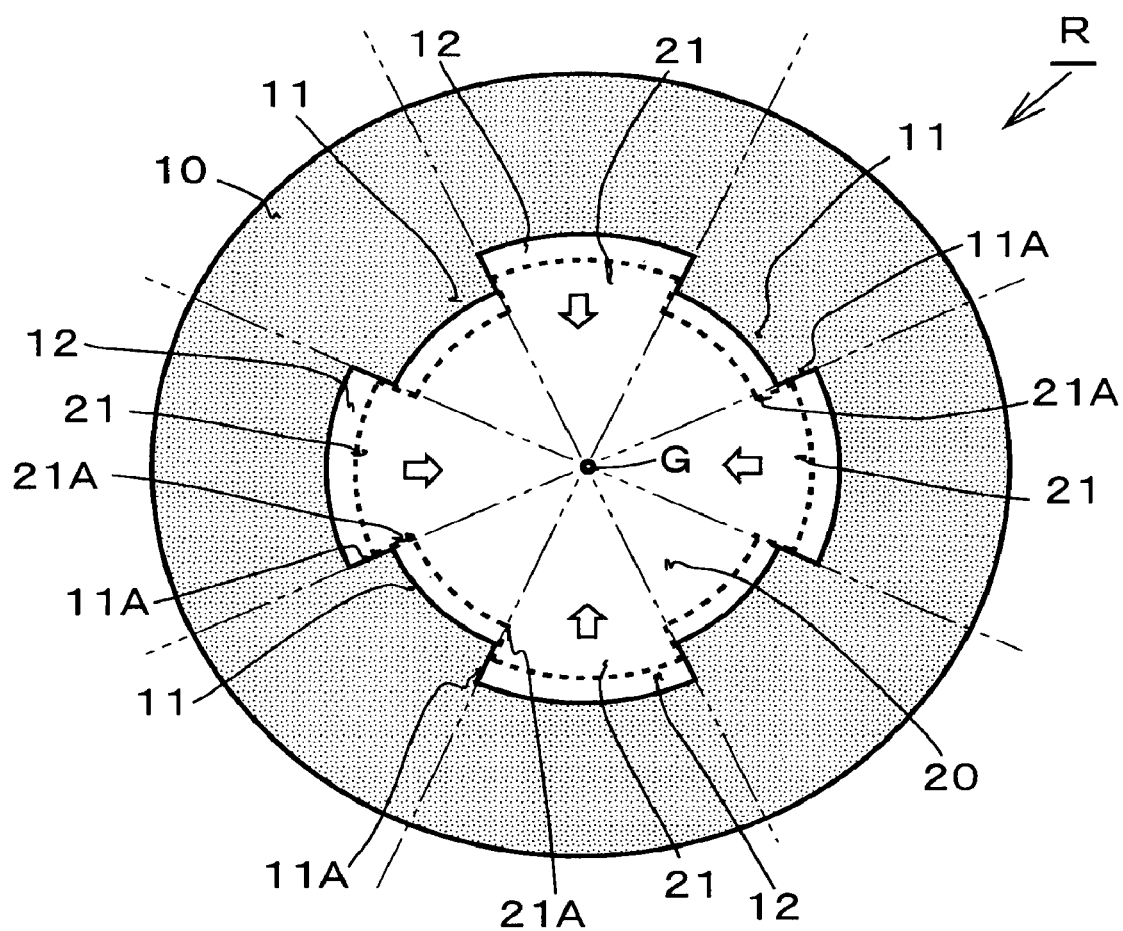
FIG. 10 is a cross sectional view schematically showing a state, in which the rotor body contracts after molding in FIG. 9.

FIGS. 1 to 6 show a magnet rotor, according to a first embodiment, applied to, for example, a movable magnet-type instrument used as an indicating instrument for automobiles, FIG. 1 being a plan view showing the movable magnet-type instrument, FIG. 2 being a cross sectional view taken along the line A-A in FIG. 1, FIG. 3 being a cross sectional view showing a state, in which the magnet rotor in FIG. 2 is turned 45 degrees, FIGS. 4(A) and 4(B) being a plan view and a perspective view showing a structure of a main part of an annular magnet, which constitutes a part of the magnet rotor, FIGS. 5(A) and 5(B) being a plan view and a perspective view showing a state, in which the annular magnet and a rotor body of the magnet rotor are injection-molded, and FIG. 6 being a cross sectional view schematically showing a state, in which the rotor body contracts after molding.

In the drawings, a whole outline of a movable magnet-type instrument M is constructed such that a pointer P is rotationally operated (instructed) through a magnet rotor R, which operates upon energization of coils C, and a drive transmission section D, which branches rotational driving of the magnet rotor R to rotationally transmit the same.

The magnet rotor R is constructed by integrally and coaxially forming an annular-shaped plastic magnet 10 polarized so that adjacent magnet poles (four magnet poles) make different poles, and a rotor body 20 made of a plastic material and arranged in a hollow of the annular-shaped plastic magnet 10, and projections 11 and recesses 12 are alternately provided on an inner peripheral wall of the hollow of the annular-shaped plastic magnet 10 to be made substantially rectangular in shape and arranged at predetermined intervals.

Also, both side walls of the projection 11 are shaped and formed so that rising side wall sections 11A provided by the projection 11 extend in a radial direction with a position of an axis G of the magnet rotor R as a reference (basic point), and the projection 11 is sector-shaped to be made narrow as it approaches a center with a position of the axis G as a basic point.

Also, rotation prevention sections 21 are formed integrally between the rotor body 20 and the annular-shaped plastic magnet 10 by filling a plastic material following configurations of the projections 11 and the recesses 12, which are provided on the annular-shaped plastic magnet 10. At this time, since the rotation prevention sections 21 on the rotor body 20 are formed following configurations of the projections 11 and the recesses 12 of the magnet 10 at the time of molding, both side walls (side wall sections) 21A of the rotation prevention sections 21 are shaped and formed in the same manner as the rising side wall sections 11A provided by the projection 11 of the magnet 10 so that the side wall sections 21A of the rotation prevention sections 21 extend in a radial direction with a position of the axis G of the magnet rotor R as a reference, with the result that the rotation prevention sections 21 are sector-shaped to be made wide as it becomes distant from a center with the position of the axis G as a basic point.

In addition, when the rotor body 20 is injection-molded, a lower flange section 22 projecting horizontally and serving as coming-off prevention is formed integrally on a bottom side of the annular-shaped plastic magnet 10, and an upper-flange section 23 projecting horizontally and serving as coming-off prevention is formed on an upper surface side of the magnet 10 to be made integral with the rotor body 20.

Also, the magnet rotor R according to the first embodiment is formed integrally on an upper end side of the rotor body 20 with a branch transmission gear section 24, by which driving is transmitted to the pointer P via the drive transmission section D, and formed on a portion about the axis G of the rotor body 20 with an axial hole 25, into which a spindle 30 is inserted, and the rotor body 20 and the annular-shaped plastic magnet 10 (the magnet rotor R) are provided to be made rotatable through the spindle 30.

In addition, the drive transmission section D is constructed such that a driven transmission gear section 40 made of a plastic material is provided to mesh with the branch transmission gear section 24 provided on the rotor body 20 of the magnet rotor R and rotation is transmitted to the pointer P via a pointer shaft 50 being a rotating shaft of the driven transmission gear section 40.

Also, the movable magnet-type instrument M comprises the spindle 30, which supports the magnet rotor R, the driven transmission gear section 40, which meshes with the branch transmission gear section 24, the pointer shaft 50 mounting the pointer P at a tip end thereof and rotating the pointer P according to rotation of the driven transmission gear section 40, a housing 60 supporting the spindle 30 and the pointer shaft 50 in an aligned state with the respective transmission gear sections 24, 40 connected together and accommodating the magnet rotor R, the branch transmission gear section 24, and the driven transmission gear section 40, the pair of coils C wound outside the housing 60, and a bowl-shaped shield case 70, which covers a predetermined region of the housing 60.

Also, the driven transmission gear section 40 is formed to be larger in diameter than the branch transmission gear section 24 on a side of the magnet rotor R, provided on an outer periphery thereof with more successive teeth than those of the branch transmission gear section 24 to be fixed to the pointer shaft 50, and extends above the magnet rotor R and toward the branch transmission gear section 22 to partially overlap the annular-shaped plastic magnet 10 with an appropriate space therefrom to mesh with the branch transmission gear section 24.

The housing 60 of the movable magnet-type instrument M is made of a plastic material and formed to be divided into a first frame body 61 positioned on a lower side and a second frame body 62 positioned on an upper side as shown in FIG. 2, a cavity is defined between the first and second frame bodies 61, 62 to accommodate the magnet rotor R, the branch transmission gear section 24, and the driven transmission gear section 4b, a lower end side of the spindle 30 is press fitted into the first frame body 61 to be supported thereby in the cavity, and a lower end of and an upper portion of the pointer shaft 50 are journaled rotatably by the respective frame bodies 61, 62.

In this case, the first and second frame bodies 61, 62 form wound frame sections 63, 64 in that region in the housing 60, in which the driven transmission gear section 40 is not arranged and corresponds to a radial, outer periphery of the magnet rotor R, and the respective coils C are wound round the wound frame sections 63, 64.

With the movable magnet-type instrument M constructed in this manner, the respective coils C are magnetized whereby respective magnetic field vectors (acting magnetic field) act, the magnet rotor R magnetized to have four magnet poles is rotated according to intensities of the respective magnetic field vectors, torque is transmitted to the pointer shaft 50 through the branch transmission gear section 24 and the driven transmission gear section 40, so that the pointer P fixed to the pointer shaft 50 makes angular movements, at that time the branch transmission gear section 24 and the driven transmission gear section 40 are respectively set in gear ratio so that the driven transmission gear section 40 rotates at a lower speed (deceleration) than that of the branch transmission gear section 24, such decelerating operation enable angular movements of the pointer P, which is less in indication error relative to an input signal, linearity in indication characteristics is ensured, and indication of high accuracy is obtained.

With the magnet rotor R, according to the first embodiment, constructed in the manner described above, in the case where the magnet rotor R is constructed by using measures such as insert-molding or the like to integrally and coaxially form the rotor body 20 made of a plastic material in the hollow of the annularly molded plastic magnet 10, the rotor body 20 is integrally and coaxially formed on the plastic magnet 10 by first setting the beforehand molded plastic magnet 10 in an insert-molding die, or injecting a thermoplastic resin material, which has been heated to melt, into a die, which has a spatial configuration conformed to a shape of the rotor body 20, after the plastic magnet 10 is molded by a forming die, and curing the resin material.

At this time, with the magnet rotor R, the projections 11 and the recesses 12, which are formed substantially rectangular in shape and arranged at predetermined intervals, are provided on the inner peripheral wall of the hollow of the annular-shaped plastic magnet 10, the rising side wall sections 11A provided by the projection 11 are formed to extend in the radial direction with a position of the axis G of the magnet rotor R as a reference, and the rotation prevention sections 21 for the annular-shaped plastic magnet 10 are formed on the rotor body 20 by filling a plastic material following configurations of the projections 11 and the recesses 12, so that the rising side wall sections 11A provided by the projection 11, which are formed substantially rectangular in shape and arranged at predetermined intervals, are formed on the inner peripheral wall of the hollow of the magnet 10 to extend in the radial direction with a position of the axis G of the magnet rotor R as a reference, whereby even when the rotor body 20 contracts as a whole, the rotation prevention sections 21 of the rotor body 20 also contract toward the axis G of the magnet rotor R, which corresponds to a position of intersection of the respective side wall sections 11A provided on the projections 11 of the plastic magnet 10, with the result that the rotor body 20 contracts in a similar figure whereby coaxial holding can be made in a state of rotation prevention without any displacement of the axis G.

Also, since eccentricity of the rotor body 20 and the magnet 10 can be suppressed, there is produced an effect that it is possible to beforehand prevent deflection of rotation of the magnet rotor R to make mesh of the gears of the movable magnet-type instrument M favorable, thus enabling stably maintaining rotational operation of the instrument.

Also, the annular-shaped magnet 10 is molded from a plastic material whereby it is possible to provide a magnet rotor, which is beneficial in promoting miniaturization and lightening and is easy to manufacture.

Also, the rotor body 20 provided on the magnet rotor R is formed integrally with the branch transmission gear section 24, by which rotation of the magnet rotor R is branched outside to enable rotational driving, whereby rotational driving can be branched and transmitted to the other drive transmission sections D via the branch transmission gear section 24, so that it is possible to transmit rotation to a location distant from the axis of the magnet rotor R.

Also, FIGS. 7 to 10 show an application of a magnet rotor R, according to a second embodiment of the invention, to a movable magnet-type instrument, in which a rotor body 20 provided on a magnet rotor R is formed integrally on upper and lower shaft core portions thereof with a rotation spindle 26, which is made of a plastic material.

Also, in substantially the same as in the first embodiment described above, the magnet rotor R is constructed by integrally and coaxially forming an annular-shaped plastic magnet 10 polarized so that adjacent magnet poles (four magnet poles) make different poles, and a rotor body 20 made of a plastic material and arranged in a hollow of the annular-shaped plastic magnet 10, and projections 11 and recesses 12 are alternately provided on an inner peripheral wall of the hollow of the annular-shaped plastic magnet 10 to be made substantially rectangular in shape and arranged at predetermined intervals.

Also, in substantially the same as in the first embodiment described above, both side walls of the projection 11 are shaped and formed so that rising side wall sections 11A provided by the projection 11 extend in a radial direction with a position of an axis G of the magnet rotor R as a reference (basic point), and the projection 11 is sector-shaped to be made narrow as it approaches a center with a position of the axis G as a basic point.

Also, rotation prevention sections 21 are formed integrally between the rotor body 20 and the annular-shaped plastic magnet 10 by filling a plastic material following configurations of the projections 11 and the recesses 12, which are provided on the annular-shaped plastic magnet 10. Since the rotation prevention sections 21 are formed following configurations of the projections 11 and the recesses 12 of the magnet 10 at the time of molding, both side walls (side wall sections) 21A of the rotation prevention sections 21 are shaped and formed in the same manner as the rising side wall sections 11A provided by the projection 11 of the magnet 10 so that the side wall sections 21A of the rotation prevention sections 21 extend in a radial direction with a position of the axis G of the magnet rotor R as a reference, with the result that the rotation prevention sections 21 are sector-shaped to be made wide as it becomes distant from a center with the position of the axis G as a basic point.

Also, when the rotor body 20 is injection-molded, a lower flange section 22A projecting horizontally and serving as coming-off prevention is formed integrally on a bottom side of the annular-shaped plastic magnet 10, and an upper flange section 23A projecting horizontally and serving as coming-off prevention is formed on an upper surface side of the magnet 10 to be made integral with the rotor body 20.

Accordingly, in substantially the same as in the first embodiment described above, the rising side wall sections 11A provided by the projection 11, which are formed substantially rectangular in shape and arranged radially at predetermined intervals on the inner peripheral wall of the hollow of the plastic magnet 10 with a position of the axis G of the magnet rotor R as a reference, are formed to extend in the radial direction with a position of the axis G of the magnet rotor R as a reference, whereby even when the rotor body 20 contracts as a whole, the rotation prevention sections 21 of the rotor body 20 also contract toward the axis G of the magnet rotor R, which corresponds to a position of intersection of the respective side wall sections 11A provided on the projections 11 of the magnet 10, so that coaxial holding can be made in a state of rotation prevention without any displacement of the axis, thus enabling preventing any positional displacement.

Also, the magnet rotor R constructed in this manner can be applied not only to a movable magnet-type instrument but also to, for example, a magnet rotor R of a stepping motor disclosed in Patent Document 2 described above, and it is possible to provide a magnet rotor R, which is small in size and lightweight and manufacture of which is made easy by integrally molding the rotation spindle 26.

In addition, the invention is not limited to the embodiments described above but various modifications can be made within a scope of the gist of the invention. For example, while the first and second embodiments adopt a plastic magnet as the annular-shaped magnet 10, change of a material such as ferrite magnet, sintered magnet, etc. is possible in some cases.

At that time, it suffices to appropriately set the projections 11 in magnitude, width dimension, number, etc. according to the outside dimension and material of the magnet, according to the embodiment, the axial hole 25, into which the spindle 30 is inserted, is formed on a portion about the axis G of the rotor body 20, and while the rotor body 20 and the annular-shaped plastic magnet 10 (the magnet rotor R) are provided to be able to rotate about the spindle 30, they may be press fitted onto and formed on the spindle through the axial hole 25 of the rotor body 20 to be rotationally driven together with the spindle.

INDUSTRIAL APPLICABILITY

Also, while a mount construction of a magnet rotor has been described as an application of the embodiments described above taking an example of a movable magnet-type instrument, a stepping motor, etc., it can be applied to a magnet rotor for a small-sized motor, a generator, etc. and embodied as a rotating magnetic sensor of a rotation detection device.

The invention claimed is:

1. A magnet rotor constructed by integrally and coaxially forming an annular-shaped magnet polarized so that adjacent magnet poles make different poles, and a rotor body made of a plastic material and arranged in a hollow of the annular-shaped magnet, the magnet rotor characterized in that a projection and a recess are provided at predetermined interval on an inner peripheral wall of the hollow of the annular-shaped magnet to be made substantially rectangular in shape, rising side wall sections provided by the projection are formed to extend in a radial direction with a position of an axis of the magnet rotor as a reference, and a rotation prevention section for the annular-shaped magnet is formed on the rotor body by filling a plastic material following configurations of the projection and the recess.

2. The magnet rotor according to claim 1, wherein the annular-shaped magnet is made of a plastic material.

3. The magnet rotor according to claim 1 or 2, wherein the rotor body provided on the magnet rotor is formed with an axial hole, through which a spindle is inserted into an axial portion of the rotor body.

4. The magnet rotor according to claim 1 or 2, wherein the rotor body provided on the magnet rotor is formed integrally on upper and lower shaft core portions thereof with a rotation spindle, which is made of a plastic material.

5. The magnet rotor according to claim 1, wherein the rotor body provided on the magnet rotor is formed integrally with a branch transmission gear section, by which rotation of the magnet rotor is branched outside to enable rotational driving.

6. A movable magnet-type instrument comprising a magnet rotor, which operates upon energization of a coil, the magnet rotor being the magnet rotor according to claim 1.

7. A stepping motor comprising a magnet rotor supported rotatably in a stator, the magnet rotor being a magnet rotor according to claim 1.

* * * * *